United States Patent
Rosseel et al.

(10) Patent No.: US 9,756,790 B2
(45) Date of Patent: Sep. 12, 2017

(54) AGRICULTURAL BALER AND METHOD FOR REMOVING A PLUG OF CROP MATERIAL STUCK IN THE FEEDER DUCT OF AN AGRICULTURAL BALER

(71) Applicant: CNH Industrial America LLC, New Holland, PA (US)

(72) Inventors: Bram Rosseel, Snellegem (BE); Jeroen Devroe, Izegem (BE); Dries Liefooghe, Veurne (BE); Dieter Kindt, Vladslo (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/296,870

(22) Filed: Oct. 18, 2016

(65) Prior Publication Data

US 2017/0105353 A1 Apr. 20, 2017

(30) Foreign Application Priority Data

Oct. 20, 2015 (BE) .................................. 2015/5679

(51) Int. Cl.
*A01F 15/10* (2006.01)
*A01D 89/00* (2006.01)
*A01F 15/04* (2006.01)

(52) U.S. Cl.
CPC .............. *A01F 15/10* (2013.01); *A01D 89/00* (2013.01); *A01F 15/101* (2013.01); *A01F 15/042* (2013.01); *A01F 2015/102* (2013.01)

(58) Field of Classification Search
CPC .... A01F 15/101; A01F 15/10; A01F 15/0825; A01F 2015/102; A01F 2015/103; A01D 89/00; A01D 89/001

(Continued)

(56) References Cited

U.S. PATENT DOCUMENTS 4,106,268 A * 8/1978 White .................. A01D 85/002
                                                     100/2
4,928,462 A * 5/1990 Lippens ................ A01F 15/101
                                                     100/142

(Continued)

FOREIGN PATENT DOCUMENTS

DE          280440 C    11/1914
DE         8126403 U1    1/1982

(Continued)

OTHER PUBLICATIONS

EP16194841.9, Extended European Search Report, dated Mar. 24, 2017, 5 pages.

*Primary Examiner* — Jimmy T Nguyen
(74) *Attorney, Agent, or Firm* — Peter K. Zacharias (57) ABSTRACT

A method for removing a plug of crop material stuck in a feeder duct of a baler including a bale chamber; a feeder duct communicating with a bale chamber feeder operable within the feeder duct to accumulate a charge of crop material therein and then stuff that accumulated charge into the bale chamber; and crop holding fingers provided at an upper end of the feeder duct to hold back the crop material while the charge of crop material is being accumulated. The method includes steps of in case of a plug of crop material being stuck in the feeder duct with the crop holding fingers in their crop holding position, moving the crop holding fingers in their withdrawn position and causing the feeder to operate in the feeder duct with the crop holding fingers in their withdrawn position.

4 Claims, 6 Drawing Sheets (58) Field of Classification Search
USPC .......................................... 100/7, 188 R, 189
See application file for complete search history.

(56) References Cited

U.S. PATENT DOCUMENTS

| | | | |
|---|---|---|---|
| 4,956,967 A * | 9/1990 | De Busscher | A01F 12/16 100/142 |
| 5,768,872 A * | 6/1998 | Von Allworden | A01D 90/02 100/189 |
| 6,050,074 A * | 4/2000 | Clostermeyer | A01F 15/101 100/88 |
| 6,647,706 B2 | 11/2003 | Vogt et al. | |
| 6,915,736 B2 * | 7/2005 | Leupe | A01F 15/0825 100/100 |
| 8,113,110 B2 | 2/2012 | Kraus | |
| 8,627,766 B2 | 1/2014 | Verhaeghe O. M. et al. | |
| 8,925,450 B2 | 1/2015 | Dresher | |
| 2003/0159421 A1 * | 8/2003 | Trelstad | A01F 15/0841 56/341 |
| 2006/0124002 A1 * | 6/2006 | Dubois | A01F 15/101 100/88 |
| 2014/0318391 A1 * | 10/2014 | Verhaeghe | A01F 15/0825 100/35 |

FOREIGN PATENT DOCUMENTS

| | | |
|---|---|---|
| DE | 2005965 U1 | 8/2000 |
| GB | 2055557 A | 3/1981 |

* cited by examiner

AGRICULTURAL BALER AND METHOD FOR REMOVING A PLUG OF CROP MATERIAL STUCK IN THE FEEDER DUCT OF AN AGRICULTURAL BALER

CROSS REFERENCE TO RELATED APPLICATION

This application claims priority to Belgium Application No. 2015/5679 filed Oct. 20, 2015, the contents of which are incorporated herein by reference.

TECHNICAL FIELD

The present invention relates to agricultural balers, and more specifically to rectangular balers, i.e. balers which produce bales of crop material which are rectangular in side view, and to a method relating to the operation of such a baler.

PRIOR ART

In EP0339733 there is disclosed a rectangular baler of basically conventional design in that it comprises a bale chamber or chamber in which a bale of crop material is formed, having an inlet opening formed therein communicating with a feeder duct. In the feeder duct feeder means are operable to accumulate a charge of crop material in the feeder duct and then stuff that accumulated charge into the bale chamber for compression by a reciprocally movable plunger operating within the bale chamber.

The bale chamber has a bottom wall in which the inlet opening is formed. The feeder duct has an upper end facing generally upwardly and communicating with the inlet opening in the bale chamber and a lower end facing generally in a forward direction. The upper boundary and the lower boundary of the feeder duct are formed by a top wall and a bottom wall, respectively, extending between the lower end and the upper end of the feeder duct.

In the baler disclosed in EP0339733 the feeder duct is provided with an opening in the bottom wall thereof and with releasable closure means for the opening. The releasable closure means for the opening are in the form of two doors. The doors are hingedly attached to respective opposed edges of the opening in the bottom wall of the feeder duct. A leading or front door, as seen relative to the direction of flow through the feeder duct, is hingedly attached to an edge of a lower end part of the bottom wall. A trailing or rear door is hingedly attached to an edge of an upper end part of the bottom wall. In normal operation of the baler the doors close the opening in the feeder duct. When a plugging of the feeder duct occurs, the feeder means are stopped and the doors are opened, allowing a plug of crop material to discharge onto the ground. Once the plug of crop material has been discharged to the ground, the doors are closed to resume normal operation.

SUMMARY OF THE INVENTION

Although the method for removing a plugging of the feeder duct as described in EP0339733 by opening the lower boundary of the feeder duct provided by the bottom wall thereof so as to discharge a plug of crop material from the feeder duct through said opening onto the ground has been found satisfactory, it is an object of the present invention to provide an improved method for removing a plugging of the feeder duct. It is in particular an object of the present invention to provide an improved method for removing a plugging of the feeder duct in rectangular balers that are provided with crop holding fingers in the upper end part of the feeder duct. These crop holding fingers are selectively movable between a crop holding position and a withdrawn position. In the crop holding position the crop holding fingers extend in the feeder duct in the upper end part thereof to hold back the crop material while the charge of crop material is being accumulated. In the withdrawn position the crop holding fingers are withdrawn from the upper end part of the feeder duct, i.e. do no longer extend in the feeder duct. In this withdrawn position the crop holding fingers no longer hold the crop material back to allow the accumulated charge of crop material to be stuffed into the bale chamber.

Thereto the method according to the present invention comprises in case of a plug of crop material being stuck in the feeder duct with the crop holding fingers in their crop holding position, moving the crop holding fingers in their withdrawn position and causing the feeder means to operate in the feeder duct with the crop holding fingers in their withdrawn position.

By withdrawing the crop holding fingers from the upper end part of the feeder duct in case of a plug of crop material being stuck in the feeder duct with in their crop holding position, i.e. while accumulating a charge of crop material in the feeder duct by means of the feeder means, a space in the upper end part of the feeder duct between the crop holding fingers and the bottom wall of the bale chamber comes available for movement of the crop material in the feeder duct in the direction of the upper end thereof. Although the space that comes available by withdrawing the crop holding fingers is relatively small, it allows for the crop material in the feeder duct downstream of the stuck plug of crop material to expand and move a relatively small distance in the direction of the bottom wall of the bale chamber, thereby relieving pressure exerted on the stuck plug of crop material at its downstream side and/or reducing pressure build up on the stuck plug of crop material at its downstream side when subsequently causing the feeder means to operate in the feeder duct with the crop holding fingers in their withdrawn position. When operating the feeder means after moving the crop holding fingers in their withdrawn position the relieved pressure and/or reduced pressure build up on the stuck plug of crop material at its downstream side help to reduce the counter pressure on the stuck plug of crop material at the downstream side thereof when the feeder means engage the crop material on the upstream side of the stuck plug of crop material and force the stuck plug of crop material in the downstream direction, i.e. in the direction of the bale chamber. This allows the feeder means to more effectively exert a force on the stuck plug of crop material in the downstream direction, thereby increasing the chance of moving the stuck plug of crop material in the downstream direction and thus dislodge the stuck plug of crop material. The dislodged plug of crop material can subsequently be removed from the feeder duct by means of the feeder means by transferring the dislodged plug of crop material into the bale chamber. The method according to the invention thus provides an alternative for discharging the plug of crop material onto the ground. This has as an advantage over prior art methods, as for instance described in EP0339733, that after removing the plug of crop material, there is no plug of crop material laying on the ground underneath the feeder duct, that, as described in EP0339733, hinders the doors of the feeder duct to be closed and the baler from being moved. There is no need for the plug of crop material laying on the ground to be removed from underneath the feeder duct for normal operation of the baler to resume.

In a preferred embodiment of the method according to the invention, the method comprises detecting the occurrence of a plugging of the feeder duct and after detecting the occurrence of a plugging of the feeder duct, in case the crop holding fingers are in their crop holding position, moving the crop holding fingers in their withdrawn position and causing the feeder means to operate in the feeder duct with the crop holding fingers in their withdrawn position.

In an advantageous embodiment thereof, the method comprises for detecting the occurrence of a plugging of the feeder duct, measuring the load on the feeder means during operation thereof in the feeder duct and comparing the measured load with a predetermined load that is indicative of a stuck plug of crop material in the feeder duct.

In a further advantageous embodiment the method according to the invention comprises in case of a plug of crop material being stuck in the feeder duct in addition to withdrawing the crop holding fingers and before causing the feeder means to operate in the feeder duct, increasing the distance between the top wall and the bottom wall of the feeder duct in at least a part of the feeder duct, while leaving the upper boundary provided by the top wall of the feeder duct and the lower boundary provided by the bottom wall of the feeder duct intact. Increasing the distance between the top wall and the bottom wall of the feeder duct in at least a part of the feeder duct allows for additional space in the feeder duct for relieving pressure on the stuck plug of crop material. In order to allow a plug of crop material plugging a part of the feeder duct to be dislodged and moved by means of the feeder means, the distance between the top wall and the bottom wall of the feeder duct is preferably at least increased in the part of the feeder duct where a plugging has occurred.

In an advantageous embodiment thereof the distance between the top wall and the bottom wall of the feeder duct is additionally increased in the part of the feeder duct down stream, as seen in the direction of conveying, of the part of the feeder duct where the plugging has occurred. This additional feature helps to relieve pressure exerted on the plug of crop material on the downstream side thereof. Furthermore, this additional feature helps to reduce pressure build up on the stuck plug of crop material at its downstream side in order to reduce the counter pressure on the stuck plug of crop material at the downstream side thereof when the feeder means engage the crop material on the upstream side of the stuck plug of crop material and force the stuck plug of crop material in the downstream direction, i.e. in the direction of the bale chamber. Still further, this additional feature prevents the dislodged plug of crop material to get stuck again while being conveyed by means of the feeder means from the part of the feeder duct where it was dislodged towards the upper end of the feeder duct.

Preferably, the distance between the top wall and the bottom wall of the feeder duct is increased over substantially the whole length of said down stream part, and more preferably over substantially the whole length of the feeder duct.

Advantageously, the distance between the top wall and the bottom wall of the feeder duct in at least part of the feeder duct is increased by moving the bottom wall away from the top wall in said at least part of the feeder duct. This is advantageous in that in rectangular balers of conventional design, there is more room available for moving the bottom wall away from the top wall than for moving the top wall away from the bottom wall.

The present invention also relates to a baler, in particular a rectangular baler, more in particular a baler comprising:

a bale chamber having an inlet opening formed therein;

a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction;

a plunger reciprocally movable within the bale chamber to compress successive charges of crop material received from the feeder duct to form a bale;

feeder means operable within the feeder duct to accumulate a charge of crop material therein and then stuff that accumulated charge into the bale chamber;

wherein crop holding fingers are provided at the upper end part of the feeder duct, that are movable between a crop holding position and a withdrawn position, wherein in the crop holding position the crop holding fingers extend in the feeder duct in the upper end part thereof to hold back the crop material while the charge of crop material is being accumulated and in the withdrawn position the crop holding fingers are withdrawn from the upper end part of the feeder duct to allow the accumulated charge of crop material to be stuffed into the bale chamber.

The baler according to the invention comprises means for selectively moving the crop holding finger between the crop holding position and the withdrawn position independently from the operation of the feeder means. The latter feature allows the method according to the invention as described herein above to be performed on the baler according to the invention.

In an advantageous embodiment of the baler according to the invention, the means for selectively moving the crop holding finger between the crop holding position and a withdrawn position comprise an actuator and a controller connected to the actuator for controlling said actuator. In an advantageous embodiment thereof, the controller is manually operable. This allows the operator of the baler to selectively move the crop holding fingers between the crop holding position and the withdrawn position. Additionally or alternatively, the controller is configured for controlling the operation of the feeder means and comprises a processor that is configured for causing the controller to perform the method according to the invention as described herein above. This allows for automated removal of a stuck plug of crop material from the feeder duct in case of a plugging of the feeder duct. Preferably, sensor means adapted for detecting a plugging of the feeder duct or for measuring load on the feeder means are connected to the processor.

In an advantageous alternative embodiment the baler is provided with a drive for driving the crop holding fingers in dependence from the operation of the feeder means, and the baler is provided with a release mechanism for selectively releasing the crop holding fingers from said drive in order to be able to move the crop holding fingers between the crop holding position and the withdrawn position independently from the operation of the feeder means. In an advantageous embodiment thereof the baler is provided with a mechanism for moving the crop holding fingers between the crop holding position and the withdrawn position after being released from said drive. This mechanism may be configured to be operated manually or by means of an actuator.

In a further advantageous embodiment of the baler according to the invention, said baler comprises means for moving at least one of the top wall and the bottom wall of the feeder duct relative to the other one of the top wall and the bottom wall of the feeder duct in at least part of the feeder duct. This allows for increasing the distance between the top wall and the bottom wall of the feeder duct in case of a plugging of the feeder duct in accordance with an above described embodiment of the method according to the invention wherein the distance between the top wall and the bottom wall of the feeder duct is increased in addition to the withdrawal of the crop holding fingers. According to a preferred embodiment of the baler according to the invention including means for moving at least one of the top wall and the bottom wall of the feeder duct, at least one of the top wall and the bottom wall of the feeder duct is divided in sections along the length of the feeder duct, said means for moving at least one of the top wall and the bottom wall of the feeder duct are adapted for selectively moving said sections relative to the other one of the top wall and the bottom wall of the feeder duct, wherein for each pair of adjacent sections, adjacent edges of the sections are mutually attached such that when moving the sections adjacent edges of the sections remain adjacent to one another, or said means for moving are adapted to move the sections such that adjacent edges of the sections remain adjacent to one another. This arrangement provides that when moving the sections in order to increase the distance between the top wall and the bottom wall of the feeder duct, the upper or lower boundary of the feeder duct provided by said sections remains intact.

In a preferred embodiment of the baler according to the invention including means for moving at least one of the top wall and the bottom wall of the feeder duct, said means comprise at least one actuator acting on at least a part of at least one of the top wall and the bottom wall of the feeder duct, wherein for controlling said at least one actuator is connected to said controller for controlling said actuator for moving said crop holding fingers. This allows for the controller to control both the movement of the crop holding fingers and the movement of the top wall and/or the bottom wall of the feeder duct in accordance with an embodiment of the method according to the invention as described herein above.

Alternatively or additionally the means for moving at least one of the top wall and the bottom wall of the feeder duct comprise at least one manually operated member acting on at least a part of at least one of the top wall and the bottom wall of the feeder duct, said manually operated member preferably defining predefined positions of the part on which it acts.

BRIEF DESCRIPTION OF THE FIGURES

The accompanying drawings are used to illustrate present non-limitative preferred exemplary embodiments of the present invention. The above stated and other advantages, features and objectives of the invention will become more apparent, and the invention better understood, from the following detailed description when read in combination with the accompanying drawings, in which.

DETAILED DESCRIPTION OF THE FIGURES

Figure 1:
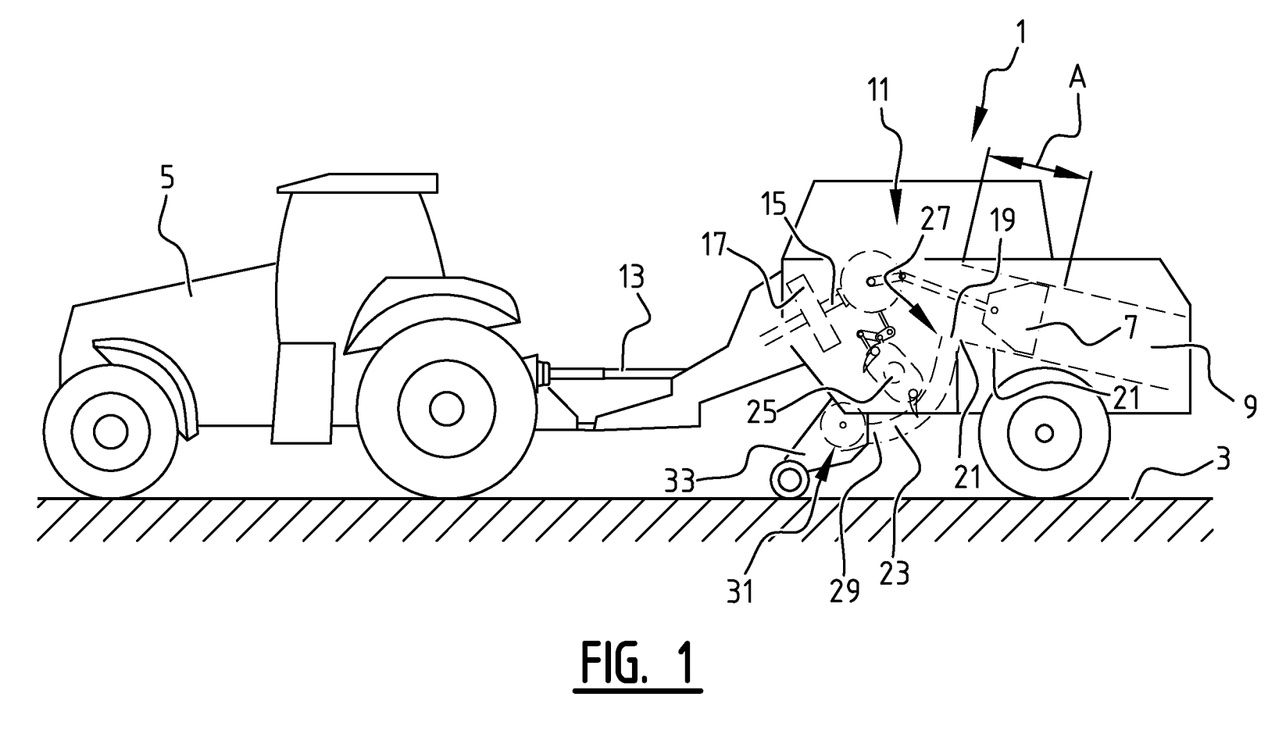
FIG. 1 shows a schematic side view of an embodiment of a baler according to the invention adapted to execute the method according to the invention, drawn and driven by a tractor.

FIG. 1 shows a rectangular agricultural baler 1. Baler 1 can be moved forward over ground surface 3 by means of a tractor 5. In baler 1 is provided with a plunger 7 that during operation is moved reciprocally along a linear path A in bale chamber 9 by means of a crank mechanism 11 connected to plunger 7. Crank mechanism 11 is connected for driving via a drive shaft 13 to the motor of tractor 5. Tractor 5 is provided for this purpose with a power take-off device, also referred to as PTO. Drive shaft 13 connects an output shaft of the PTO of tractor 5 to an input shaft 15 of crank mechanism 11. A flywheel 17 is arranged on the input shaft of the crank mechanism.

The bale chamber 9 has an inlet opening 19 formed in the bottom wall 21 thereof. A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 has an upper end 27 facing generally upwardly and communicating with the inlet opening 19 in the bale chamber 9 and a lower end 29 facing generally in a forward direction and communicating with a cutting unit 31. The cutting unit 31 is arranged for cutting crop material supplied by a pick-up device 33 and to convey the cut crop material into the feeder duct 23.

Figure 2:
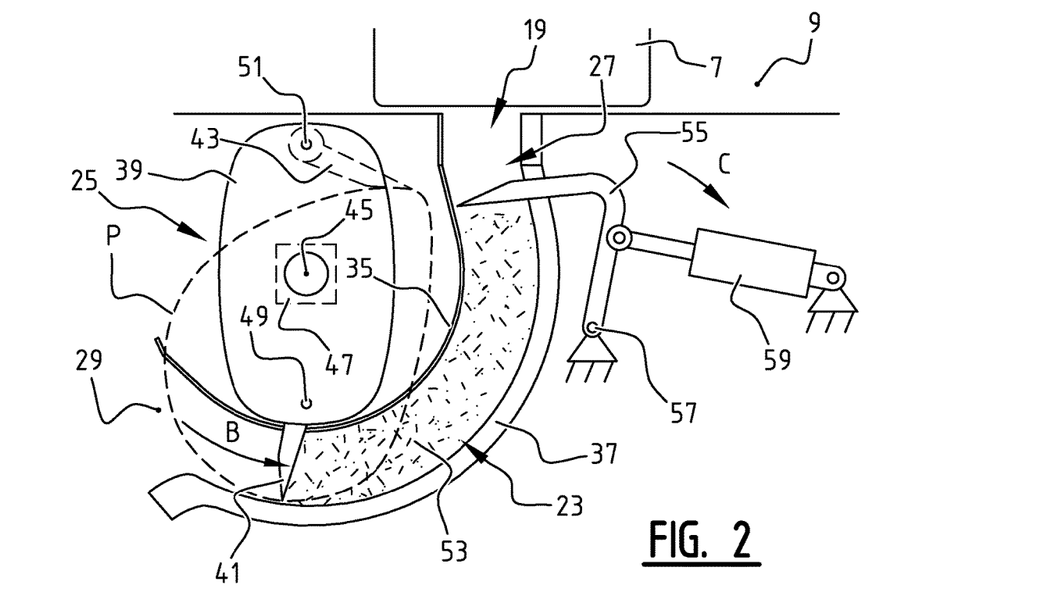
FIGS. 2 and 3 show in schematic side view the feeding duct of the baler of FIG. 1 during normal operation.
Figure 3:
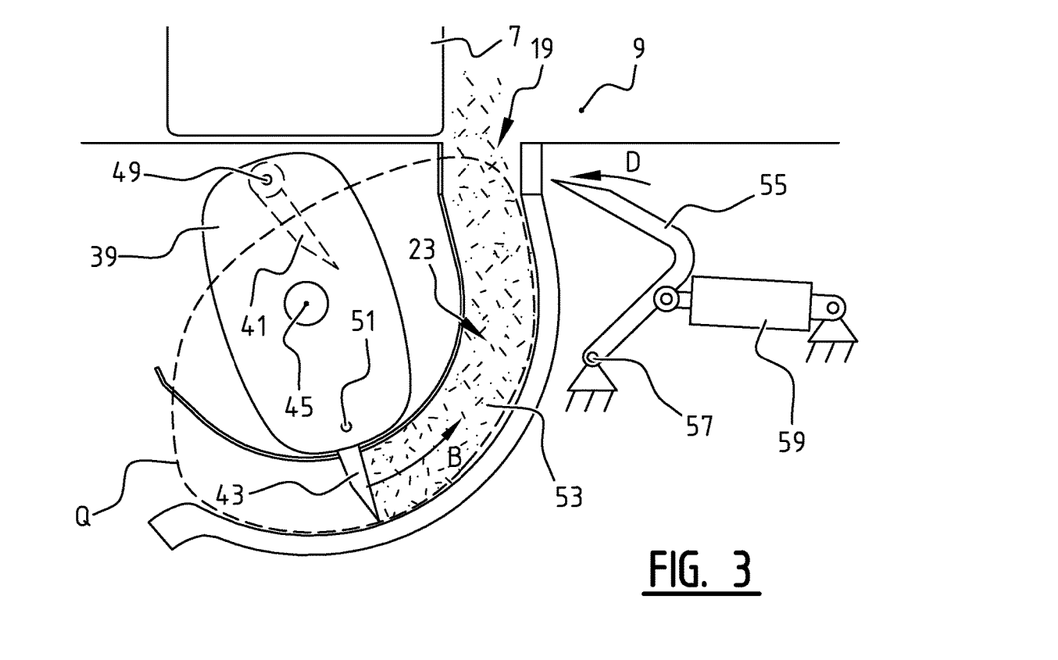

In FIGS. 2 and 3 the feeder duct 23 is shown in more detail during normal operation. The feeder duct 23 is defined between a feeder duct top wall 35 and feeder duct bottom wall 37. The feeder duct top wall 35 provides an upper boundary for the feeder duct 23. The feeder duct bottom wall 37 provides a lower boundary for the feeder duct 23. In the feeder duct 23 feeder means 25 are operable. The feeder means 25 include a rotatable drum 39 having sets of tines 41, 43 arranged thereon. In operation the drum 39 is rotated in the direction of arrow B about axis of rotation 45.

The feeder means 25 further include a schematically shown drive 47. The drive 47 is arranged for rotating the drum 39 in the direction of arrow B about axis of rotation 45. The drive 47 further includes a mechanism for rotating the respective sets of tines 41, 43 relative to the drum 39 about a respective axis of rotation 49, 51, while the drum 39 is rotated in the direction of arrow B about axis of rotation 45. This causes the outer ends of the tines 41, 43 to be moved along a path of movement. This path of movement may be a fixed path of movement or an adjustable path of movement, wherein the drive 47 comprises a mechanism for adjusting the path of movement of the sets of tines 41, 43, while the drum 39 is rotated in the direction of arrow B about axis of rotation 45.

During normal operation, the outer ends of the tines 41, 43 are caused to be moved along a path of movement P, Q through the feeder duct 23 in the direction indicated by arrow B, thereby conveying cut crop material that has been conveyed by the cutting unit 31 into the lower end 29 of the feeder duct 23, from the lower end 29 of the feeder duct 23 toward the upper end 27 thereof.

As illustrated by means of FIG. 2, the feeder means 25 first accumulate a charge of crop material 53 in the feeder duct 23. Thereto, tines 41, 43 are moved through the feeder duct 23 along an accumulating movement path P. While the charge of crop material 53 is being accumulated, crop holding fingers 55 provided at the upper end 27 of the feeder duct 23 extend in the feeder duct 23 in the upper end part thereof to hold back the crop material 53 that is being accumulated. The crop holding fingers 55 thus prevent that said crop material 53 is forced through the opening 19 into the bale chamber 9. Furthermore, while the charge of crop material 53 is being accumulated, the plunger 7 reciprocates in the bale chamber 9, wherein during part of the reciprocating movement, the plunger 7 blocks the opening 19.

As illustrated by means of FIG. 3, once the charge of crop material 53 has been accumulated, the plunger 7 that reciprocates in the bale chamber 9 is clear from the opening 19 in the bale chamber 9, and the bale chamber 9 is ready to receive the accumulated charge of crop material 53, the crop holding fingers 55 are withdrawn from the upper end part of the feeder duct 23. In particular, the crop holding fingers 55 are withdrawn from the upper end part of the feeder duct 23 by rotating the crop holding fingers 55 in the direction of arrow C (see FIG. 2) about axis of rotation 57 by means of linear actuator 59. Subsequently, the outer ends of the tines 43 are caused to be moved along a stuffing movement path Q through the feeder duct 23 in the direction indicated by arrow B, thereby stuffing, i.e. conveying, the accumulated charge of crop material 53 through the opening 19 into the bale chamber 9. After the charge of crop material 53 has been stuffed into the bale chamber 9, the crop holding fingers 55 are moved in the direction of arrow D back into their crop holding position wherein they extend in the feeder duct 23 in the upper end part thereof, and the feeder means 25 operate to accumulate a next charge of crop material in the feeder duct 23.

Figure 4:
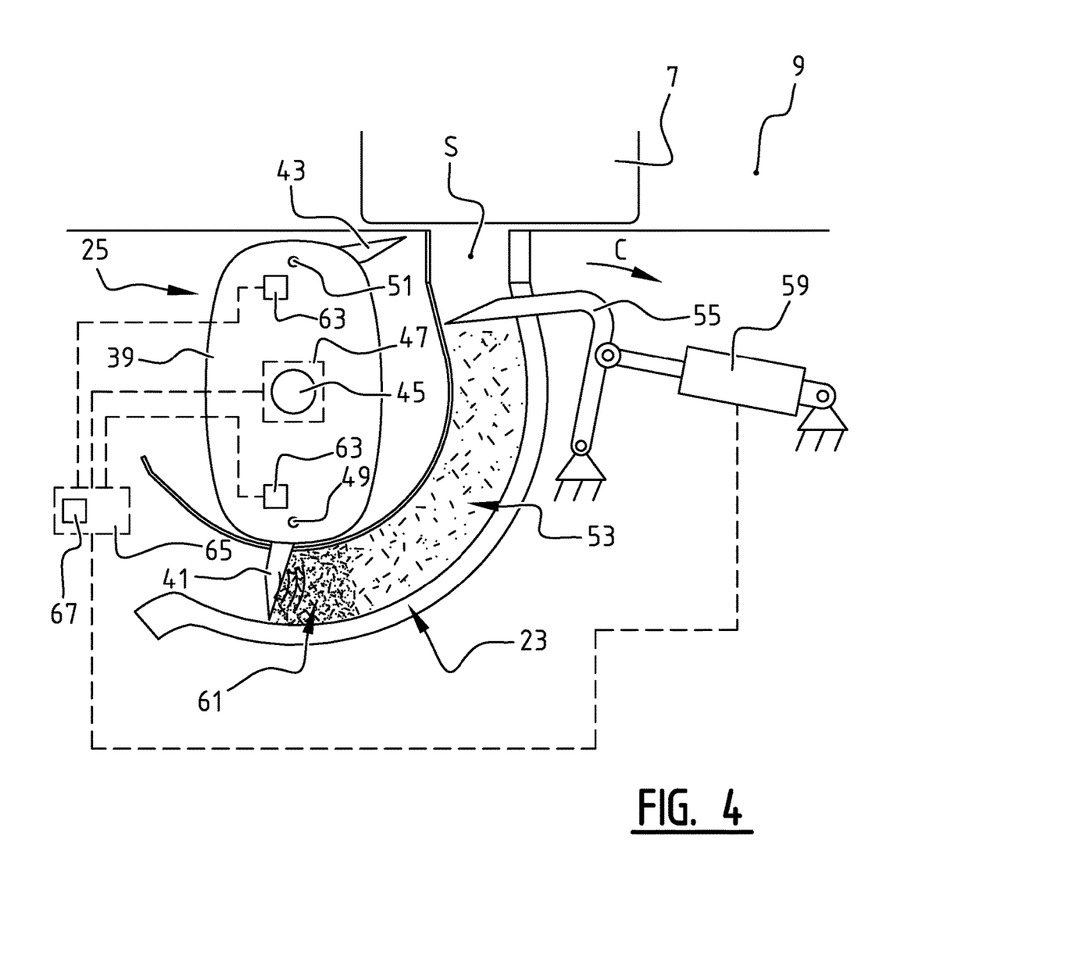
FIGS. 4 to 6 show in schematic side view the feeding duct of the baler of FIG. 1 the method according to the invention for removing a stuck plug of crop material from the feeder duct according to a first embodiment.

In FIG. 4 is shown a situation wherein during accumulation of the charge of crop material 53, a plug 61 of crop material gets stuck in the feeder duct 23 causing the feeding means 25 to become inoperable. As shown in FIG. 4 sensor means 63 are provided that are configured to measure the load on the sets of tines 41, 43. The sensor means 63 are connected to a controller 65 that in turn is connected to the actuator 59 of the crop holding fingers 55 and to the drive 47 of the feeder means 25. The controller 65 is provided with a processor 67 that compares the measured load on the sets of tines 41, 43 with a predetermined load that is indicative of a plugging of the feeder duct. Once a plugging of the feeder duct 23 is detected, the controller 65 cause the drive 47 of the feeder means 25 to stop operation of the feeder means 25. The operation of the feeder means 25 is stopped by stopping the rotation of the drum 39 or by adjusting the path of movement of the outer ends of the tines 41, 43 such that the outer ends do not pass through the feeder duct 23.

Subsequently, in order to dislodge the plug 61 of crop material, the controller 65 controls the actuator 59 of the crop holding fingers 55 such that the crop holding fingers 55 are moved from the crop holding position in the direction of arrow C into the withdrawn position (shown in FIG. 5) wherein the crop holding fingers 55 do no longer hold back the crop material 53. As a result, and as illustrated by means of FIG. 5, the crop material 53 is allowed to expand and to move into the space S (shown in FIG. 4 between the crop holding fingers and the bale chamber 9). This relieves the pressure exerted on the stuck plug 61 of crop material at its downstream side and provides additional space for the plug 61 of crop material and the crop material 53 downstream thereof to be moved into the direction of the upper end of the feeder duct 23 indicated by arrow B (see FIG. 5) with reduced pressure build up.

Figure 6:
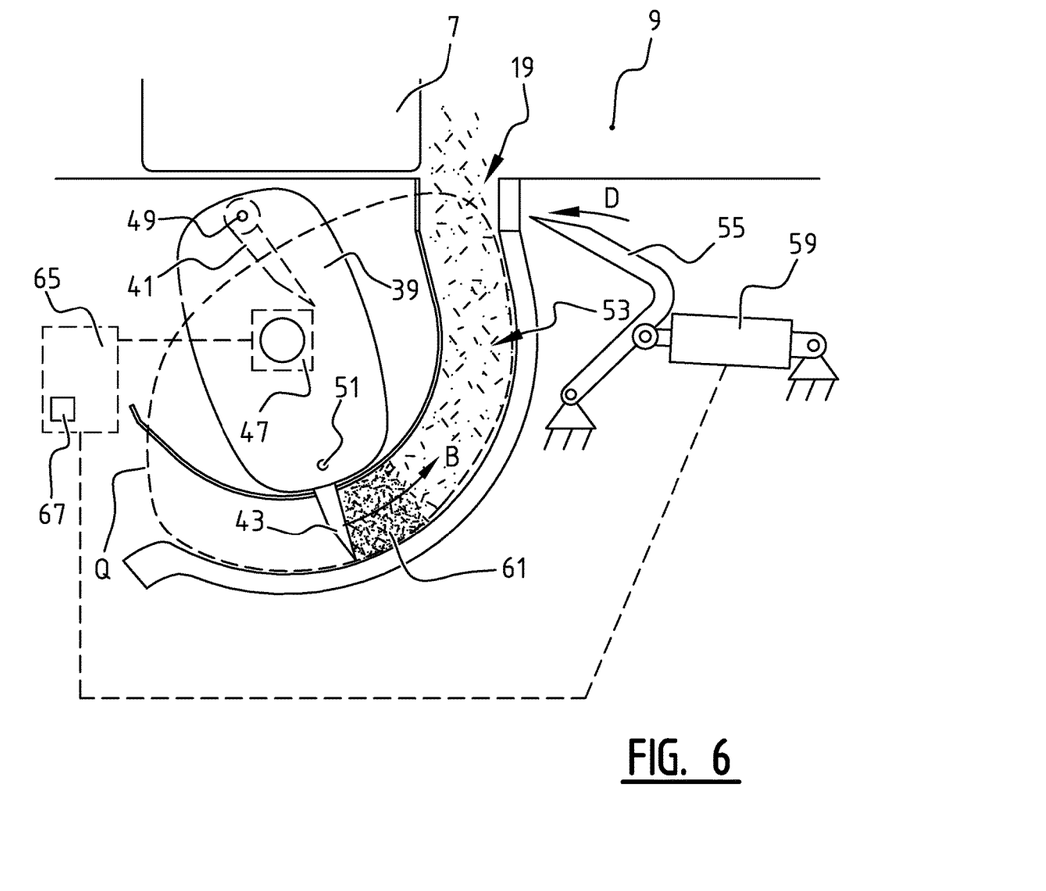

Subsequently, the controller 65 controls the drive 47 of the feeder means 25 such that the feeder means 25 are caused to resume operation wherein the outer ends of the tines 41 resume movement along the accumulating movement path P through the feeder duct 23 in the direction indicated by arrow B. As a result of the relieved pressure exerted on the stuck plug 61 of crop material at its downstream side and the additional space for moving the plug of crop material and the crop material downstream thereof into the direction of the upper end of the feeder duct indicated by arrow B with reduced pressure build up, the counter pressure experienced by the outer ends of the tines 41 while exerting force on the stuck plug 61 of crop material at its upstream side, is reduced thereby allowing the outer ends of the tines 41 to dislodge the stuck plug 61 of crop material and continue its accumulating movement path P. This allows the feeder means 25 to resume normal operation, wherein, as illustrated by FIG. 6, once the plunger 7 that reciprocates in the bale chamber 9 is clear from the opening 19 in the bale chamber 9, and the bale chamber 9 is ready to receive the accumulated charge of crop material 53, the outer ends of the tines 43 are caused to be moved along the stuffing movement path Q through the feeder duct 23 in the direction indicated by arrow B, thereby stuffing, i.e. conveying, the accumulated charge of crop material 53 including the dislodged plug 61 of crop material through the opening 19 into the bale chamber 9. After the charge of crop material 53 has been stuffed into the bale chamber 9, the crop holding fingers 55 are moved in the direction of arrow D back into their crop holding position wherein they extend in the feeder duct 23 in the upper end part thereof, such that the feeder means 25 can accumulate a next charge of crop material in the feeder duct 23.

In case the plunger 7 has already cleared the opening 19 when moving the crop holding fingers 55 from the crop holding position in the direction of arrow C into the withdrawn position in order to provide the additional space S or when resuming operation of the feeder means 25 in order to dislodge the stuck plug of crop material 61, the bale chamber 9 provides additional space for the crop material 53 downstream of the plug of crop material 61 to move into. This allows for further reduction of pressure exerted on the stuck plug 61 of crop material at its downstream side and/or pressure build up when moving the plug of crop material and the crop material downstream thereof into the direction of the upper end of the feeder duct indicated by arrow B.

It should be understood that the specific paths of movement of the tines indicated in the FIGS. 2 to 6 as well as the number of tines of the feeder means are exemplary.

Figure 5:
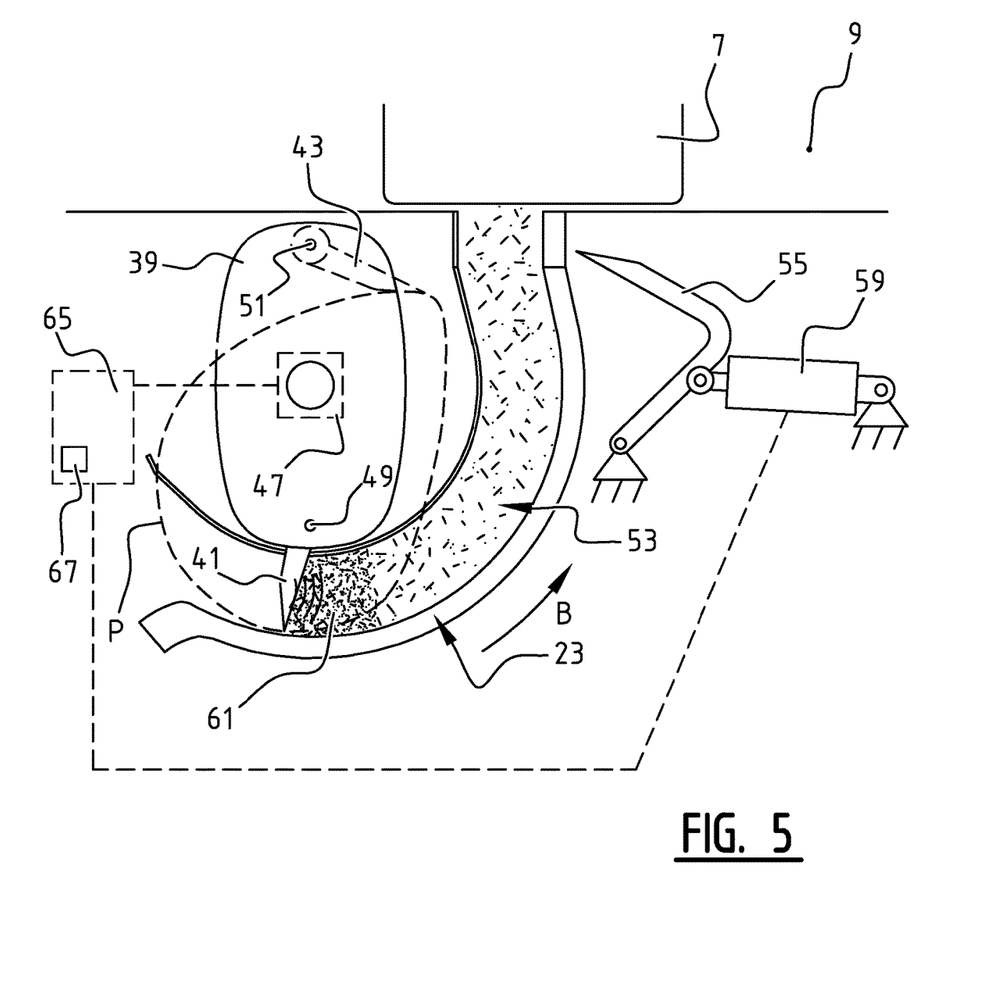
Figure 7:
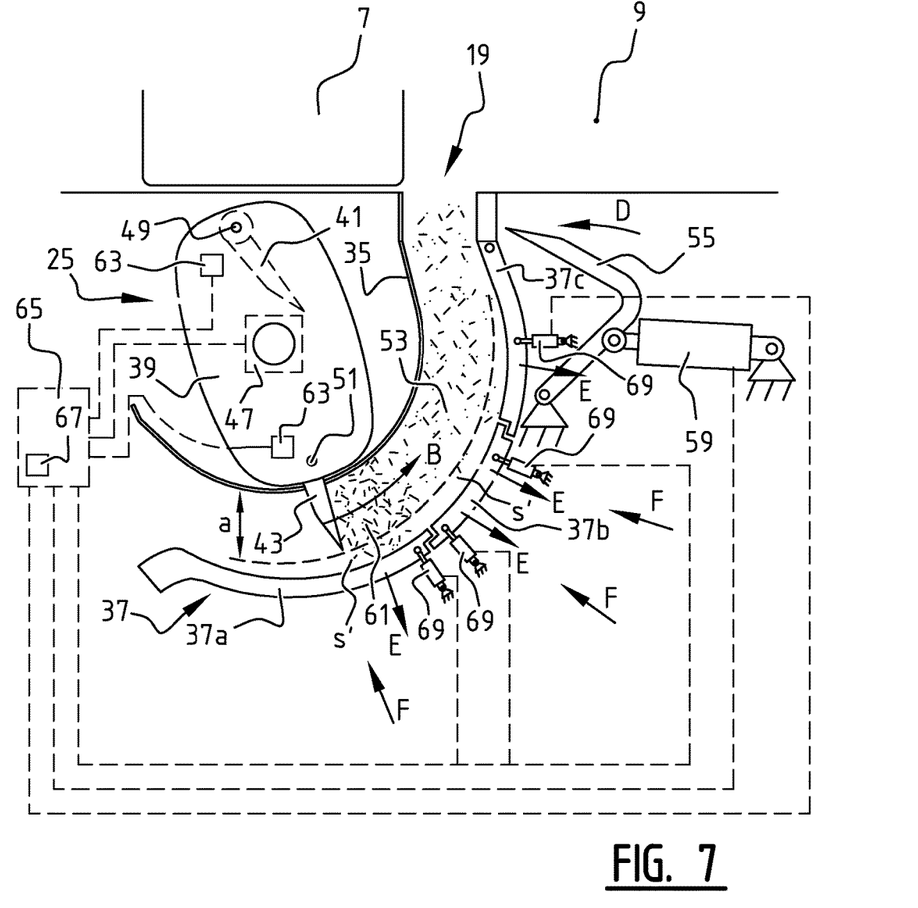
FIG. 7 shows in schematic side view the feeding duct of the baler of FIG. 1 an alternative embodiment of the method according to the invention.

FIG. 7 is illustrative of an alternative embodiment of the method illustrated by means of FIGS. 4 to 6, wherein in case during accumulation of the charge of crop material, a plug 61 of crop material 53 gets stuck in the feeder duct 23 causing the feeding means 25 to become inoperable, in addition to withdrawing the crop holding fingers 55 and before causing the feeder means 25 to operate in the feeder duct 23 to dislodge the stuck plug 61 of crop material, the distance a between the top wall 35 and the bottom wall 37 of the feeder duct 23 is increased, while leaving the upper boundary provided by the top wall 35 of the feeder duct and the lower boundary provided by the bottom wall 37 of the feeder duct 23 intact. In particular it is schematically shown that three sections 37a, 37b, 37c of the bottom wall of the feeder duct 23 having overlapping edges are moved from their original position, indicated with the dotted line, away from the top wall 35 of the feeder duct 23 in the direction of arrows E by means of linear actuators 69 that are connected to and controlled by the controller 65. As a result additional space S' is provided in the feeder duct 23 that further relieves the pressure exerted on the stuck plug 61 of crop material and that allows for more movement of the stuck plug 61 of crop material and the crop material downstream 53 thereof. After the plug 61 of crop material has been removed from the feeder duct 23 by conveying the dislodged plug 61 of crop material into the bale chamber 9, the three sections 37a, 37b, 37c of the bottom wall 37 of the feeder duct 23 are moved back into their original position in the direction indicated by arrow F by means of linear actuators 69 and the crop holding fingers 55 are moved in the direction of arrow D back into their crop holding position by means of actuator 59 wherein they extend in the feeder duct 23 in the upper end part thereof, such that the feeder means 25 can accumulate a next charge of crop material in the feeder duct 23.

Although the principles of the invention have been set forth above with reference to specific embodiments, it must be understood that this description is given solely by way of example and not as limitation to the scope of protection, which is defined by the appended claims.

The invention claimed is:

1. A method for removing a plug of crop material stuck in a feeder duct of a baler, the baler comprising:
   a bale chamber having an inlet opening formed therein;
   a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction;
   a plunger reciprocally movable within the bale chamber to compress successive charges of crop material received from the feeder duct to form a bale;
   a feeder operable within the feeder duct to accumulate a charge of crop material therein and then stuff that accumulated charge into the bale chamber; and
   crop holding fingers provided at the upper end of the feeder duct, that are movable between a crop holding position and a withdrawn position, wherein in the crop holding position the crop holding fingers extend into the feeder duct in the upper end thereof to hold back the crop material while the charge of crop material is being accumulated and in the withdrawn position the crop holding fingers are withdrawn from the upper end of the feeder duct to allow the accumulated charge of crop material to be stuffed into the bale chamber;
   wherein the method comprises steps of:
      detecting an occurrence of a plugging of the feeder duct, the step of detecting comprising:
         measuring a load on the feeder during operation thereof in the feeder duct and
         comparing the measured load with a predetermined load that is indicative of the occurrence of the plugging of the feeder duct; and
      after detecting the occurrence of the plugging of the feeder duct indicating that a plug of crop material being stuck in the feeder, in a case in which the crop holding fingers are in their crop holding position, moving the crop holding fingers to their withdrawn position and causing the feeder to operate in the feeder duct with the crop holding fingers in their withdrawn position.

2. The method according to claim 1, wherein the feeder duct has a top wall and a bottom wall extending between the lower end and the upper end of the feeder duct, the top wall providing an upper boundary of the feeder duct and the bottom wall providing a lower boundary of the feeder duct, the method further comprising a step of:
   in a case of a plug of crop material being stuck in the feeder duct, in addition to withdrawing the crop holding fingers and before causing the feeder to operate in the feeder duct, increasing a distance between the top wall and the bottom wall of the feeder duct in at least a part of the feeder duct, while leaving the upper boundary provided by the top wall of the feeder duct and the lower boundary provided by the bottom wall of the feeder duct intact.

3. The method according to claim 2, wherein the part of the feeder duct is where the plugging has occurred, the method further comprising steps of:
   additionally increasing the distance between the top wall and the bottom wall of the feeder duct in a part of the feeder duct downstream, as seen in a direction of conveying, of the part of the feeder duct where the plugging has occurred; and
   increasing the distance between the top wall and the bottom wall of the feeder duct over substantially a whole length of the downstream part.

4. The method according to claim 2, wherein the distance between the top wall and the bottom wall of the feeder duct in part of the feeder duct is increased by moving the bottom wall away from the top wall in the part of the feeder duct.

* * * * *